(12) United States Patent
Tripathi

(10) Patent No.: US 7,937,499 B1
(45) Date of Patent: May 3, 2011

(54) METHODS AND APPARATUS FOR DYNAMICALLY SWITCHING BETWEEN POLLING AND INTERRUPT MODE FOR A RING BUFFER OF A NETWORK INTERFACE CARD

(75) Inventor: Sunay Tripathi, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 2008 days.

(21) Appl. No.: 10/888,521

(22) Filed: Jul. 9, 2004

(51) Int. Cl.
*G06F 15/16* (2006.01)

(52) U.S. Cl. ........................ 709/250; 709/232

(58) Field of Classification Search .................. 709/250, 709/232; 710/19, 48, 206, 261
See application file for complete search history.

(56) References Cited

U.S. PATENT DOCUMENTS

| | | | | |
|---|---|---|---|---|
| 4,449,182 A | * | 5/1984 | Rubinson et al. | 710/60 |
| 4,550,368 A | * | 10/1985 | Bechtolsheim | 711/206 |
| 5,299,313 A | * | 3/1994 | Petersen et al. | 709/234 |
| 5,301,275 A | | 4/1994 | Vanbuskirk et al. | |
| 5,412,782 A | * | 5/1995 | Hausman et al. | 709/250 |
| 5,414,858 A | * | 5/1995 | Hoffman et al. | 710/48 |
| 5,471,618 A | * | 11/1995 | Isfeld | 710/19 |
| 5,485,584 A | * | 1/1996 | Hausman et al. | 710/22 |
| 5,555,414 A | * | 9/1996 | Hough et al. | 710/261 |
| 6,167,423 A | | 12/2000 | Chopra et al. | |
| 6,173,343 B1 | * | 1/2001 | Delorme | 710/48 |
| 6,356,951 B1 | | 3/2002 | Gentry, Jr. | |
| 6,434,651 B1 | * | 8/2002 | Gentry, Jr. | 710/260 |
| 6,467,008 B1 | | 10/2002 | Gentry, Jr. et al. | |
| 7,376,080 B1 | * | 5/2008 | Riddle et al. | 370/229 |
| 2002/0087710 A1 | | 7/2002 | Aiken et al. | |
| 2002/0156897 A1 | | 10/2002 | Chintalapati et al. | |
| 2003/0056047 A1 | | 3/2003 | Connor et al. | |
| 2003/0135723 A1 | | 7/2003 | Illg | |
| 2003/0187914 A1 | * | 10/2003 | Kaniyar et al. | 709/201 |

FOREIGN PATENT DOCUMENTS

EP 0903670 A1 3/1999

OTHER PUBLICATIONS

Constantinos Dovrolis, "Operating System Issues in Network Interfaces," Jan. 2001, http://www.cc.gatech.edu/fac/Constantinos.Dovrolis/oper_sys.html, 2 pages.

(Continued)

*Primary Examiner* — Rupal D Dharia
*Assistant Examiner* — Robert B McAdams
(74) *Attorney, Agent, or Firm* — Osha • Liang LLP

(57) ABSTRACT

Methods and apparatus for processing packets in a computer system including an operating system and a network interface card (NIC) are disclosed. The NIC having a plurality of ring buffers is configured to operate in either a polling mode or an interrupt mode for a particular ring buffer. When the NIC is in the polling mode for a ring buffer, the NIC is periodically polled to determine whether one or more packets have been received by the ring buffer. When the NIC is in the interrupt mode, the operating system is capable of receiving an interrupt indicating that the ring buffer of the NIC has received one or more packets. The operating system is capable of instructing the NIC to change its mode from the polling mode to the interrupt mode for a particular ring buffer, and from the interrupt mode to the polling mode for a particular ring buffer.

42 Claims, 6 Drawing Sheets

OTHER PUBLICATIONS

"Unix Manual Page for in.mpathd," http://www.scit.wlv.ac.uk/cgi-bin/mansec?1M+in.mpathd, downloaded from the Internet on Oct. 5, 2004, 5 pages.

"Docs.sun.com—Sun Product Documentation," http://www.docs.sun.com/db/doc/816-0211/6m6nc66sm?a=view, downloaded from the Internet on Oct. 5, 2004, 4 pages.

"ISCSI," http://en.wikipedia.org/wiki/ISCSI, downloaded from the Internet on Oct. 5, 2004, 2 pages.

"TCP Offload Engine," http://en.wikipedia.org/wiki/TCP_Offload_Engine, downloaded from the Internet on Oct. 5, 2004, 1 page.

Foreign Search Report for corresponding application No. GB 0423765.7, 3 pages, dated Mar. 9, 2005.

Examination Report under Section 18(3) for corresponding application No. GB 0423765.7, 3 pages, dated Jan. 23, 2006.

German Search Report for corresponding application No. DE 10 2004 052 412.2-53, 3 pages, dated Feb. 6, 2009.

* cited by examiner

Mapping generated and maintained by IP layer:

CPU1/Squeue1 ⇔ Ring buffer identifier1
CPU2/Squeue2 ⇔ Ring buffer identifier2
...
CPUn/Squeuen ⇔ Ring buffer identifiern

METHODS AND APPARATUS FOR DYNAMICALLY SWITCHING BETWEEN POLLING AND INTERRUPT MODE FOR A RING BUFFER OF A NETWORK INTERFACE CARD

RELATED APPLICATIONS

This application claims priority from patent application Ser. No. 10/698,211, entitled "METHODS AND APPARATUS FOR SWITCHING BETWEEN POLLING AND INTERRUPT TO HANDLE NETWORK TRAFFIC," by Sunay Tripathi, filed on Oct. 31, 2003, which is incorporated herein by reference for all purposes.

This application is related to patent application Ser. No. 10/888,792, entitled "METHODS AND APPARATUS FOR DRIVING A HIGH BANDWIDTH NETWORK INTERFACE CARD WITH A SINGLE INTERRUPT SOURCE," by Tripathi et al, filed on the same day, which is incorporated herein by reference for all purposes.

BACKGROUND

At the top of a network protocol stack, applications are generally written to function through the use of a specific network protocol. An application developer typically writes a different version of the application for use with different network protocols. Many developers have overcome these issues by writing applications based upon a common or standard interface. Generally, these interfaces communicate directly with the socket layer of the kernel. The socket layer was designed to provide independence from the network communication layer and interfaces with system call routines that interface to the kernel.

The kernel includes the socket layer and the network protocol stack. In addition, a Network Interface Card (NIC) Driver capable of communicating with a NIC is in communication with the kernel via a standard interface such as a Data Link Provider Interface.

Traditionally, when a NIC receives a packet over the network, the NIC issues an interrupt. The driver notifies the operating system kernel of the interrupt. The kernel processes the interrupt and obtains the packet from the NIC via the driver. As each packet is subsequently received by the NIC, the NIC generates an interrupt. Thus, the operating system kernel obtains each packet from the NIC as interrupts are generated. Accordingly, packets that are received by the NIC are processed immediately by the operating system kernel.

A server is typically contacted by a client when data is requested from the server. Thus, the server's primary responsibility is to respond to each server request with the requested data. Unfortunately, since the server is required to respond immediately to interrupts generated when packets are received, this received data is given a higher priority than that given to packets that are transmitted by the server. Accordingly, a client receiving packets from a server may perceive a substantial delay as packets are being transmitted by the server.

Moreover, the processing power of CPUs have not scaled at the pace that network communications have. Thus, if packets arrive quickly on the network in comparison to the processing capability of the CPU handling the interrupt, the CPU will be continually interrupted. Since the processing capability of the CPU handling the interrupt does not match the speed at which interrupts are issued, the CPU will be unable to process all of the interrupts. Accordingly, due to these continuous interrupts, a "livelock" occurs, resulting in an effective freezing of the CPU for all practical purposes.

SUMMARY

The present invention enables a network interface card to be operated in multiple modes for each memory (e.g., ring buffer) of the network interface card, enabling its ability to interrupt a CPU for each ring buffer to be controlled. A ring buffer is generally defined as a buffer of data which is of fixed size; when it fills, further data is placed back at the start of the buffer, overwriting the old data, in a "ring." Specifically, the modes of the network interface card may be controlled by an operating system kernel. In this manner, the operating system kernel may disable or enable interrupt processing of the network interface card for one or more of the ring buffers, thereby enabling the performance of the server to be optimized.

In accordance with one aspect of the invention, methods and apparatus for processing packets in a computer system including an operating system and a network interface card having a plurality of ring buffers are disclosed. When the network interface card is in a polling mode for one of the plurality of ring buffers, the operating system kernel polls the network interface card to determine whether one or more packets have been received by the one of the plurality of ring buffers. When the network interface card is in an interrupt mode for one of the plurality of ring buffers, the CPU is capable of receiving an interrupt from the network interface card that indicates that the ring buffer of the interface card has received one or more packets. Packets that have been received by the ring buffer may then be obtained from the network interface card and processed.

In accordance with another aspect of the invention, the operating system is configured to instruct the network interface card to operate in the polling mode or the interrupt mode for one or more ring buffers. In accordance with one embodiment, the operating system controls the operating mode of the network interface card for each of the ring buffers such that the network interface card is in the polling mode for a ring buffer during periods of heavy network traffic associated with the ring buffer and in the interrupt mode for a ring buffer during periods of light to moderate network traffic associated with the ring buffer. Specifically, the operating system dynamically instructs the network interface card to operate in a first mode for one of the ring buffers when packets are received from/by the ring buffer of the network interface card at less than a predefined rate or the number of packets in the CPU memory corresponding to the ring buffer is less than a predefined number, the network interface card in the first mode for the ring buffer being capable of interrupting a CPU when a packet is received by the ring buffer of the network interface card. Similarly, the operating system instructs the network interface card to operate in a second mode for one of the ring buffers when packets are received from/by the ring buffer of the network interface card at greater than a predefined rate or the number of packets in the CPU memory corresponding to the ring buffer is greater than a predefined number, the network interface card in the second mode for the ring buffer being disabled from interrupting the CPU when a packet is received by the ring buffer of the network interface card. Accordingly, for a network intensive workload at a particular ring buffer, the system will likely remain in the polling mode for that ring buffer.

In accordance with yet another aspect of the invention, a computer system includes an operating system and a network interface card coupled to the operating system, where the network interface card is configured to operate in an interrupt mode for a particular ring buffer when in a first state and to operate in polling mode for a particular ring buffer when in a second state, the network interface card when in the interrupt mode for a ring buffer being configured to interrupt the operating system when a packet is received by the ring buffer of the network interface card over a network. When in the polling mode for a ring buffer, the network interface card may be disabled from issuing an interrupt entirely for that ring buffer, or in specific circumstances for that ring buffer (e.g., for packets having normal to low priority).

In accordance with one embodiment, the computer system includes one or more CPUs, each CPU having an associated queue, and a network interface card having a plurality of memories (e.g., buffers). When an interrupt is received from the network interface card for one of the buffers, a set of one or more packets are transferred from the identified buffer to the queue associated with one of the CPUs. Similarly, upon polling the network interface card for one of the buffers, if it is determined that one or more packets have been received by the one of the buffers of the network interface card, the one or more packets in the buffer are transferred to the queue associated with the CPU. Each of the packets in the queue associated with the CPU are then processed. Since the set of packets may be transferred simultaneously as a chain of packets (e.g., linked list), the performance of the server is improved.

In accordance with an embodiment of the invention, each of the ring buffers is mapped to one of a plurality of CPUs and its associated memory (e.g., software queue). In this manner, the ability of a network interface card to interrupt a specific CPU is determined by the buffer for which the interrupt is issued. For instance, the ability of the network interface card to interrupt a specific CPU may be determined by the number of packets in the corresponding buffer. In addition, the packets in the buffer of the network interface card may be transferred by the operating system to the corresponding queue. This is accomplished by assigning a ring buffer identifier to map each ring buffer of the network interface card to one of the CPUs and its associated queue. In this manner, packets may be efficiently transferred from a ring buffer of the network interface card to the corresponding queue for processing by the associated CPU.

The embodiments of the invention may be implemented software, hardware, or a combination of hardware and software. The invention can also be embodied as computer readable code on a computer readable medium. In addition, data structures disclosed are also part of the invention.

BRIEF DESCRIPTION OF THE DRAWINGS

Embodiments of the invention may best be understood by reference to the following description taken in conjunction with the accompanying drawings in which.

DETAILED DESCRIPTION

In the following description for embodiments of the invention, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
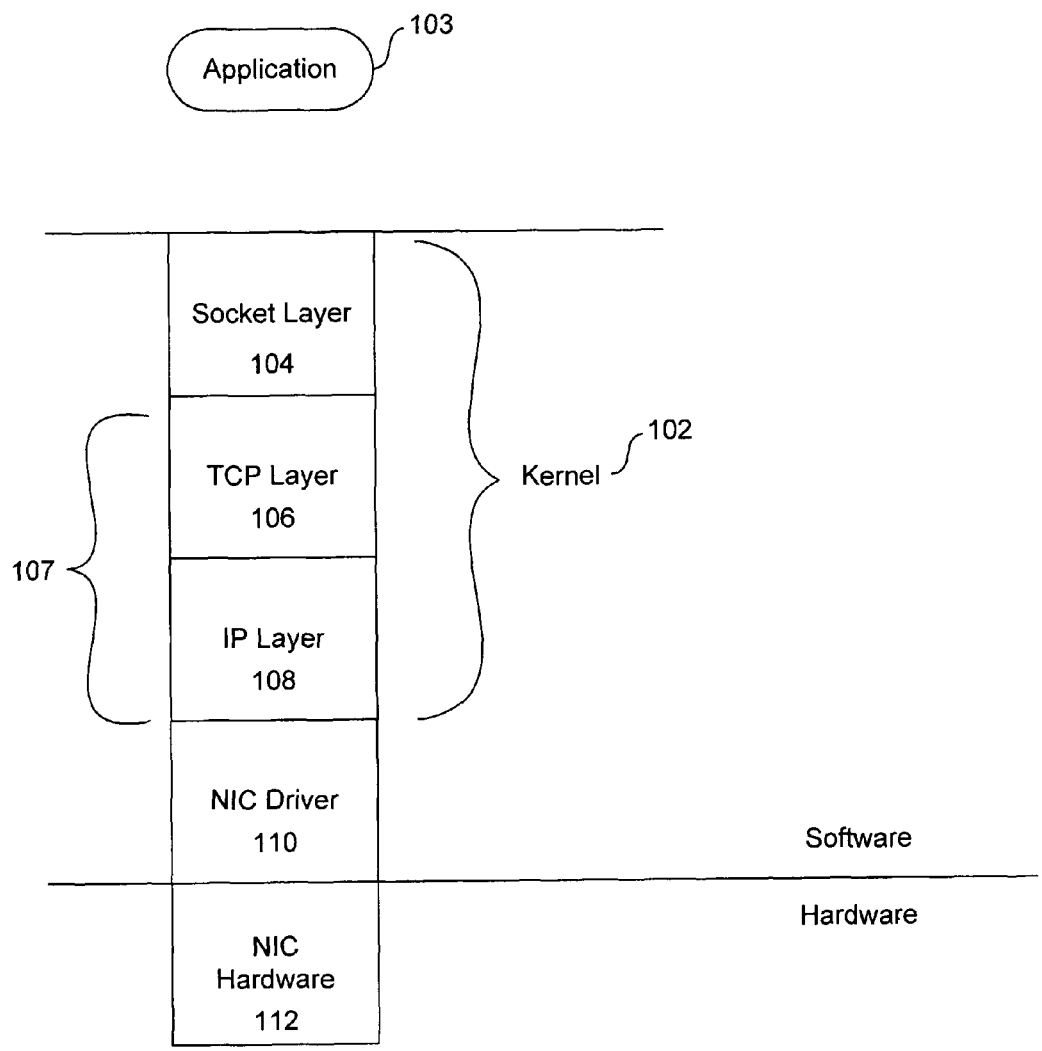
FIG. 1 is a block diagram illustrating a computer system including a Network Interface Card (NIC).

As shown in FIG. 1, an exemplary operating system includes a kernel 102. The kernel is the core of the computer operating system. The kernel's services may be requested by other parts of the operating system or by an application 103 through a system call routine.

At the top of the network protocol stack 107, applications 103 are generally written to function through the use of a specific network protocol. The application developer then needs to write a different version of the application for it to operate using different network protocols. Many developers have overcome these issues by writing applications based upon a common or standard interface, such as NetBIOS, WinSock, or BSD sockets. Generally, these interfaces communicate directly with the socket layer 104 of the kernel. The socket layer was designed to provide independence from the network communication layer and interfaces with system call routines that interface to the kernel 102.

The kernel 102 includes the socket layer 104 and the network protocol stack 107, which includes a TCP layer 106 and an IP layer 108. Specifically, the TCP layer 106 is capable of performing a TCP three way handshake to establish a TCP connection, and manages the assembling of a message or file into packets that may be transmitted over the Internet during the TCP connection. The IP layer 108 handles the addressing for each packet. In addition, a Network Interface Card (NIC) Driver 110 capable of communicating with a NIC 112 is in communication with the kernel 102 via a standard interface such as a Data Link Provider Interface.

Traditionally, when a NIC 112 receives a packet over the network, the NIC 112 issues an interrupt. The driver 110 notifies the operating system kernel 102 of the interrupt. The kernel 102 processes the interrupt and obtains the packet from the NIC 112 via the driver 110. As each packet is subsequently received by the NIC 112, the NIC 112 generates an interrupt. Thus, the operating system kernel 102 obtains each packet from the NIC 112 as interrupts are generated. Accordingly, packets that are received by the NIC 112 are processed immediately by the operating system kernel 102.

As a NIC receives packets over the network, it typically generates interrupts. While an interrupt is practical in high priority situations that occur infrequently, an interrupt is not practical for low priority situations that occur frequently.

In electronic communication, 'polling' is the periodic checking of other programs or devices by one program or device to see what state they are in, usually to see whether they are still connected or want to communicate. Specifically, a controlling device attached to another device sends a message to the device periodically, asking whether it has anything to communicate.

Polling is a viable option for use in situations that are low-priority situations that occur frequently. For instance, the NIC could be placed in polling mode for a particular ring buffer, and any packets received by that ring buffer of the NIC could be obtained periodically from the NIC. However, permanently placing the NIC in polling mode for a particular ring buffer would potentially result in a substantial delay for those packets that are received by the ring buffer of the NIC.

In accordance with one embodiment of the invention, the NIC is configured for operating in two modes for each ring buffer: polling mode and interrupt mode. Specifically, when the NIC is in the polling mode for a particular ring buffer, the operating system kernel periodically polls the ring buffer of the NIC to determine whether one or more packets have been received by the ring buffer. When the NIC is in the interrupt mode for a particular ring buffer, the NIC issues an interrupt when the ring buffer of the NIC has received one or more packets that need to be handled by the operating system kernel.

In accordance with another embodiment of the invention, the operating system is capable of instructing the NIC to operate in either the polling mode or the interrupt mode for a particular ring buffer. Specifically, the network interface card is instructed to operate in the polling mode for a particular ring buffer when packets are being received frequently by the ring buffer of the network interface card, while the network interface card is instructed to operate in the interrupt mode for a particular ring buffer when packets are being received infrequently by the ring buffer of the network interface card. Frequency may be established through establishing a predefined numerical threshold value, such as the number of packets received per second by the ring buffer of the NIC. For instance, when the number of packets queued in the CPU queue is below a specified limit or the number of packets per second being received by/from the ring buffer of the network interface card is less than a predefined number of packets, then the network interface card may be instructed to operate in the interrupt mode for that ring buffer. Similarly, when the number of packets queued in the CPU queue is greater than a specified limit or the number of packets per second being received by/from the ring buffer of the network interface card is greater than or equal to a predefined number of packets, then the network interface card may be instructed to operate in the polling mode for that ring buffer. In another embodiment of the invention, if the operating system is already processing a packet received earlier or to be transmitted and there are more queued packets in the queue of the CPU, the NIC is instructed to operate in polling mode for the corresponding ring buffer.

Figure 2:
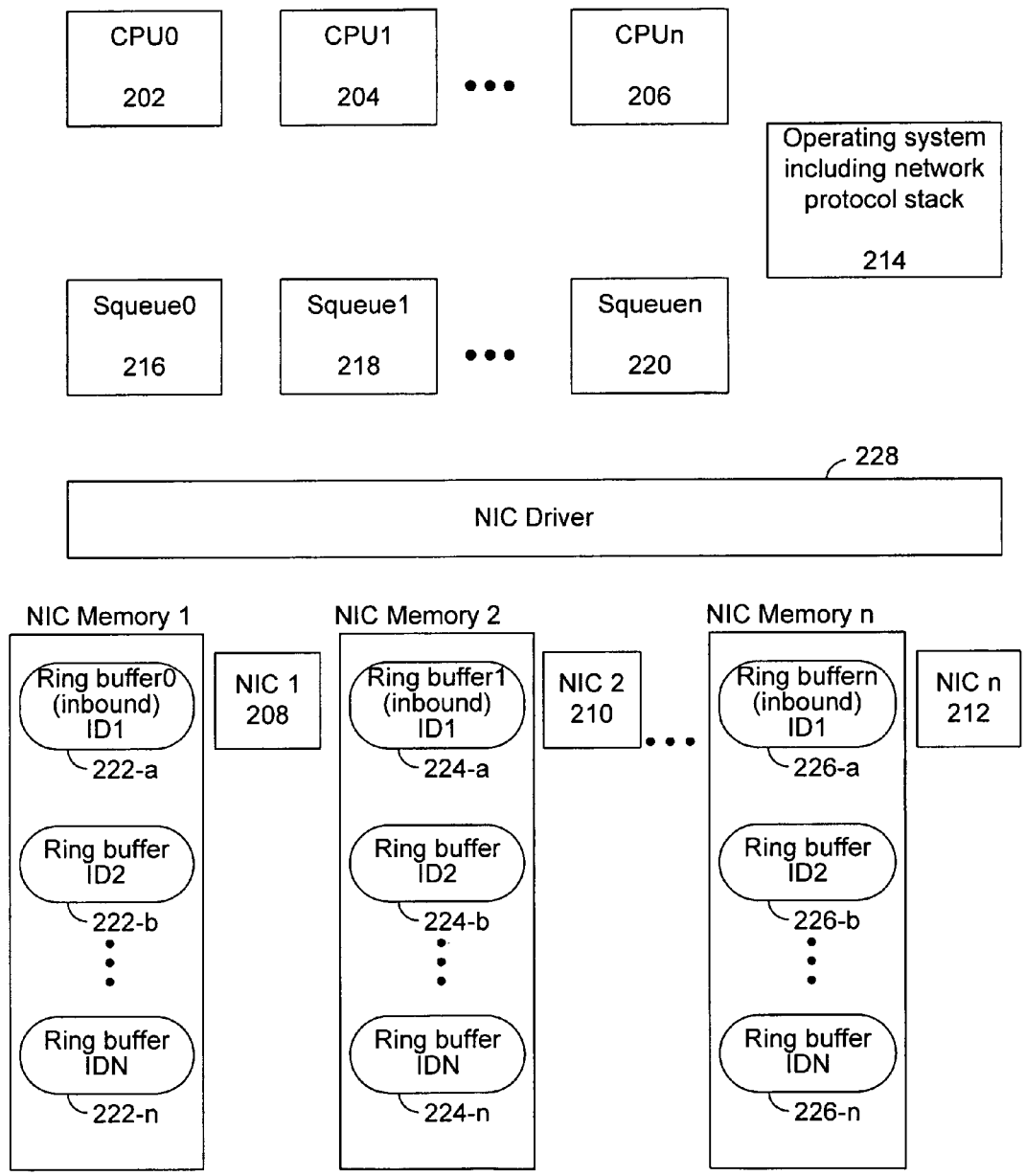
FIG. 2 is a block diagram illustrating a system in which the present invention may be implemented in accordance with one embodiment of the invention.

FIG. 2 is a block diagram illustrating a system in which the present invention may be implemented in accordance with one embodiment of the invention. As shown, the computer system may include one or more Central Processing Units (CPUs) shown as CPU0 202, CPU1 204, and CPUn 206. In addition, the system may include one or more network interface cards (NICs) shown as NIC0 208, NIC1 210, and NICn 212. In accordance with one embodiment, the mode (e.g., interrupt, polling) of a particular ring buffer of a NIC is established in association with one of the CPUs. In this manner, it is possible to instruct a NIC whether it is permitted to interrupt a particular CPU on behalf of a corresponding ring buffer, while still enabling the NIC to interrupt other CPUs on behalf of other ring buffers for that NIC or other NICs.

Operating system 214 includes an operating system kernel having a network protocol stack. For instance, the network protocol stack may be a TCP/IP stack. The operating system also includes an interrupt handler. Generally, an interrupt handler prioritizes interrupts that are received by the operating system and saves them in a queue if more than one is waiting to be handled. When an interrupt is received from one of the NICs 208, 210, 212, the interrupt is prioritized in the queue. A scheduler of the operating schedules the operation of different programs as the interrupts are received.

Generally, when a hardware device generates an interrupt, the interrupt has a value that associates it with a particular device. Thus, the interrupt value (implicitly or explicitly) identifies one of the NICs. In accordance with one embodiment, the interrupt value also identifies the one of the CPUs being interrupted. For example, the interrupt value or another, second interrupt value identifies one of the ring buffers associated with the CPU being interrupted. Thus, a single or multiple interrupt identifier(s) (e.g., interrupt or NIC/buffer identifiers) may be used to map a particular ring buffer of a NIC to a particular CPU. Thus, through the use of one or more identifiers, both the ring buffer of the NIC and the CPU being interrupted may be identified by the operating system kernel receiving the interrupt notification.

As shown in FIG. 2, in accordance with one embodiment, each of the CPUs 202, 204, 206 has an associated queue Squeue0 216, Squeue1 218, and Squeue n 220, respectively, for storing packets. The queue may store inbound and/or outbound packets. In addition, each of the NICs 208, 210, 212 has a plurality of associated memories (e.g., ring buffers) for storing inbound packets as they are received over a network. Thus, as shown each of the NICs 208, 210, 212 has an associated set of ring buffers 222*a-n*, 224*a-n*, and 226*a-n*, respectively.

In accordance with one embodiment, each of the queues Squeue0 216, Squeue1 218, Squeue n 220 associated with one of the CPUs 202, 204, 206 is capable of storing both inbound packets and outbound packets. As a result, both inbound packets and outbound packets are given equal priority. For instance, each of the queues Squeue0 216, Squeue1 218, Squeue n 220 may be a serialization queue such as that disclosed in the Patent Application entitled "A System and Method for Vertical Perimeter Protection," naming Sunay Tripathi and Bruce Curtis as inventors, filed on Oct. 10, 2003, which is incorporated herein by reference for all purposes.

As described above, the interrupt value (e.g., ring buffer identifier and NEC identifier, or interrupt identifier) may be used to identify both one of the CPUs 202, 204, 206 and one of the ring buffers associated with one of the NICs 208, 210, 212. In addition, the identifier may be further mapped to one of the queues 216, 218, 220 associated with one of the CPUs 202, 204, 206. In this manner, one of the queues 216, 218, 220 is mapped to one of the ring buffers 222*a-n*, 224*a-n*, 226*a-n* to facilitate the transfer of packets from one of the ring buffers to one of the queues. In accordance with one embodiment, a single identifier is used to map one of the CPUs 202, 204, 206 and its associated queue 216, 218, or 220 with one of the ring buffers of one of the NiCs 208, 210, 212.

Communication between the CPUs 202, 204, 206 and the NICs 208, 210, 212 may be achieved through the use of a driver 228. In accordance with one embodiment, the driver includes one or more application programming interfaces (APIs) (e.g., CHANGE_INTERRUPT(BUFFER_NUMBER) to enable the operating system kernel to instruct one of the NICs 208, 210, 212 to change its mode from the interrupt mode to the polling mode for a particular ring buffer, or from the polling mode to the interrupt mode for a particular ring buffer. In addition, an API (e.g., GET_PACKETS(BUFFER_NUMBER) may be provided that enables the operating system kernel to move a set of packets from one of the buffers 222a-n, 224a-n, 226a-n associated with one of the NICs 208, 210, 212 to one of the queues 216, 218, 220 associated with one of the CPUs 202, 204, 206. Thus, the operating system kernel may instruct a NIC to change its mode from interrupt mode to polling mode for one or more ring buffers, or from polling mode to interrupt mode for one or more ring buffers. In response, the NIC enters the polling mode or the interrupt mode for the specified ring buffer(s), as instructed.

In addition, it may be desirable for the operating system to ascertain whether the network interface card is in an interrupt mode or a polling mode for a particular ring buffer. The operating system, once aware of the state of the network interface card for a particular ring buffer, may then operate accordingly. Specifically, when the NIC is in the polling mode for a particular ring buffer, the operating system polls the NIC periodically for packets that may have been received by that ring buffer. When the NIC is in the interrupt mode for a particular ring buffer, the operating system operates to retrieve packets from the ring buffer when an interrupt is received from the NIC on behalf of the ring buffer.

As described above, the NIC is capable of operating in two different modes for each of the ring buffers or the NIC. However, this example is merely illustrative, and other additional modes may also be implemented. Moreover, it is also possible that the interrupt mode and the polling mode be implemented in different manners. Generally, the NIC generates an interrupt when a packet is received by a ring buffer while operating in the interrupt mode for that ring buffer, but cannot generate an interrupt on behalf of the ring buffer when a packet is received by that ring buffer while operating in the polling mode for that ring buffer. Alternatively, when the NIC is in the polling mode for a particular ring buffer, the NIC may generate an interrupt when a packet is received by the ring buffer, but only for packets deemed to have a high priority (not for packets deemed to have a low priority). High priority may refer to a single priority or may refer to a range of priorities of packets.

Specifically, in accordance with one embodiment, the network interface card when in the interrupt mode for a particular ring buffer is configured to interrupt the operating system when a packet is received by the ring buffer of the network interface card over a network. When the network interface card is in the polling mode for the ring buffer, the NIC is unable to interrupt the operating system on behalf of that ring buffer, thereby enabling the operating system to poll the network interface card to obtain packets from the ring buffer of the network interface card. In accordance with another embodiment, the network interface card is unable to interrupt the operating system on behalf of the ring buffer when in the polling mode for the ring buffer for packets having low priority, but continues to be able to interrupt the system when in the polling mode for the ring buffer for packets having high priority.

As described above, a NIC is capable of operating in two different modes for each ring buffer associated therewith. These modes may be entered upon initialization (e.g., boot up), upon instruction from an external source (e.g., CPU or driver associated with the NIC), or upon instruction internally from within the NIC. For instance, the NIC may choose to alter its mode of operation due to an external (e.g., busy or non-busy state) or internal factor (e.g., hardware error). It is also contemplated that the NIC may enter a mode of operation permanently (e.g., until further instruction) or temporarily (e.g., for a specified period of time). Thus, the CPU may instruct the NIC to enter the polling mode or the interrupt mode for one or more buffers for a specified period of time, after which it returns to its previous mode of operation. Alternatively, the CPU may instruct the NIC to enter a mode of operation for a particular ring buffer through the use of a specific instruction to enter that mode, or through the use of a toggle operation to cause the NIC to enter the mode of operation that is opposite to its current mode of operation.

Figure 3:
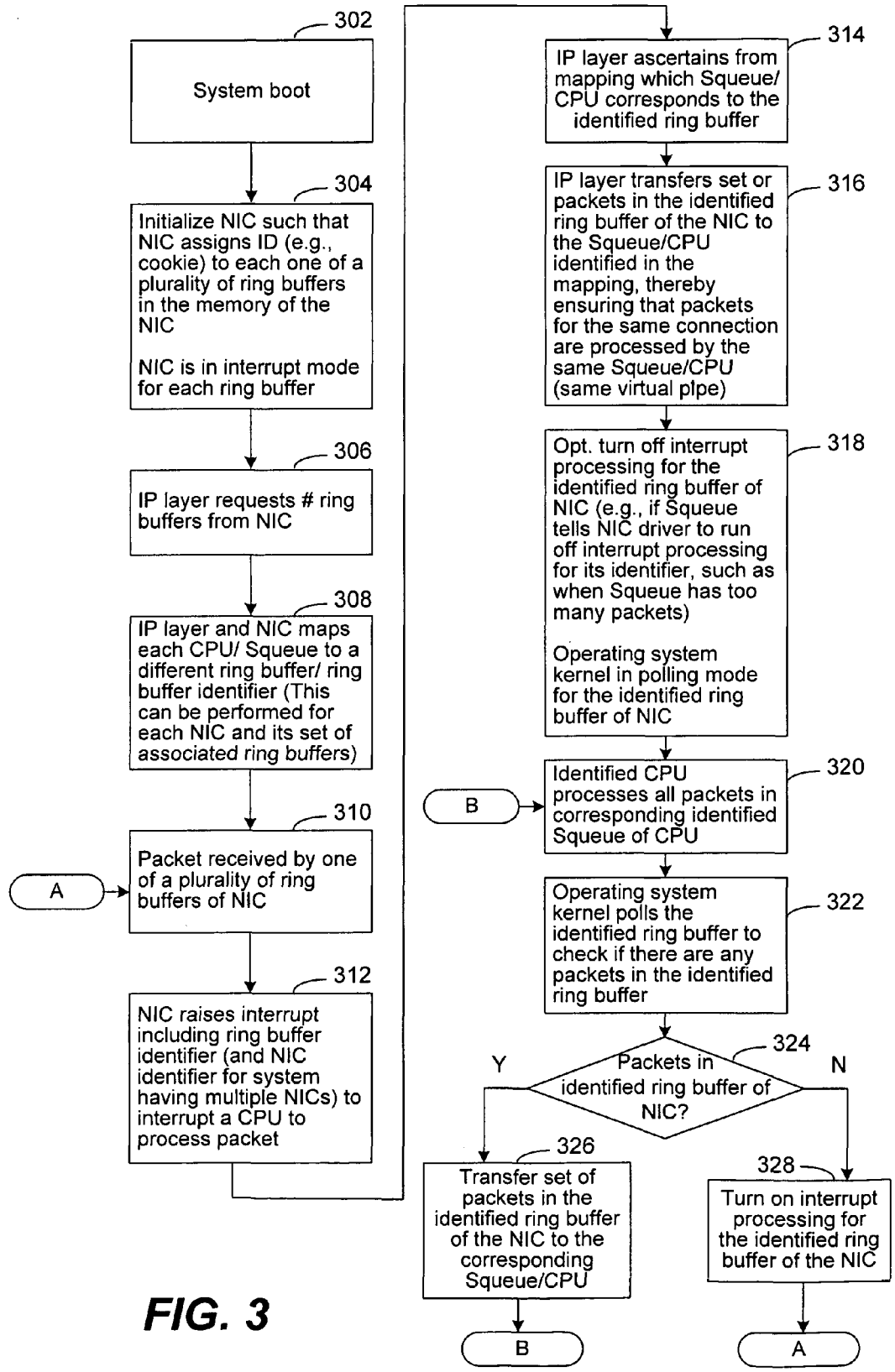
FIG. 3 is a process flow diagram illustrating a general method of performing polling to handle network traffic in accordance with one embodiment of the invention.

FIG. 3 is a process flow diagram illustrating a general method of performing polling to handle network traffic in accordance with one embodiment of the invention. As described above, a NIC and an associated buffer may be mapped to a CPU and its associated queue. In accordance with one embodiment, this mapping is performed during initialization of the computer system. Thus, when the computer system is booted at block 302, the NIC is initialized at block 304 such that each ring buffer of the NIC is mapped to a specific CPU, thereby associating the CPU's queue with the corresponding ring buffer. This may be accomplished through the use of a ring buffer identifier as described above with reference to FIG. 2. One method of initializing the system to accomplish such a mapping will be described in further detail below with reference to FIG. 5. Since the ring buffer identifier identifies a particular CPU, the NIC is made aware of which CPU it is going to interrupt. Upon receiving the ring buffer identifier, the operating system kernel stores the ring buffer identifier (e.g., during initialization or upon receiving an interrupt) such that the ring buffer identifier is associated with an interrupted CPU and its associated queue. As described above, the ring buffer identifier identifies the ring buffer of the NIC (and may also identify a corresponding interrupt line). In addition, the NIC may be initialized such that it initially operates in interrupt mode for one or more ring buffers (e.g., all of the ring buffers).

In addition to initializing the NIC, the kernel of the operating system is also initialized with the number of ring buffers in each NIC. In accordance with one embodiment, this initialization includes a request from the IP layer to the NIC for the number of ring buffers in the NIC at 306. The IP layer (as well as the NIC) may then map each ring buffer (e.g., ring buffer identifier) to a CPU and its associated queue at 308. This may be performed for each NIC and its associated set of ring buffers. Alternatively, the IP layer may be configured with the number of ring buffers for each NIC. In this manner, the IP layer may maintain a mapping between the ring buffers and corresponding CPUs and the queues associated therewith.

When a packet is received by one of the ring buffers of a NIC at 310, an interrupt may be raised by the NIC (e.g., if it is in interrupt mode for that ring buffer). Assuming that the NIC is operating in interrupt mode for a particular ring buffer, the NIC asserts an interrupt at block 312. As described above, the interrupt may identify the ring buffer via a ring buffer identifier (in addition to a NIC identifier).

When an interrupt is received from the NIC, the kernel identifies the appropriate CPU and its associated software queue corresponding to the ring buffer identified in the interrupt at 314. For instance, the mapping may be ascertained by the IP layer.

A set of one or more packets are transferred from the identified ring buffer associated with the NIC to the queue associated with the CPU as identified in the mapping at block 316. This transfer may be performed by the IP layer. In accordance with one embodiment, the set of packets are transferred simultaneously. For instance, a pointer to a linked list of packets may be added to the queue of packets associated with the identified CPU.

The NIC then switches to the polling mode at block 318 for the ring buffer. For instance, the NIC may be switched to the polling mode for the ring buffer when the interrupt identifying the ring buffer is received from the NIC (or shortly thereafter) or prior to processing the packets in the queue mapped to the ring buffer. Specifically, in accordance with one embodiment, the kernel of the operating system instructs the NIC to enter the polling mode for the specified ring buffer. For instance, the NIC may be instructed to enter the polling mode from the interrupt mode for the ring buffer identified by the ring buffer identifier. Thereafter, the kernel of the operating system operates to poll the ring buffer of the NIC periodically.

After the packets are retrieved from the ring buffer of the NIC, the operating system kernel processes each of the packets in the queue of the CPU at block 320. Since the queue contains both inbound and outbound packets, the CPU equally prioritizes inbound and outbound packets.

Once all of the packets in the queue of the CPU have been processed, the operating system kernel polls the NIC at block 322 to determine if the ring buffer of the NIC received one or more packets. For instance, the operating system kernel, the driver and/or the NIC may ascertain whether there are any packets in the identified ring buffer. This may be accomplished, for example, by querying the NIC with a specific ring buffer identifier.

If one or more packets have been received by the identified ring buffer of the network interface card as shown at block 324 (e.g., if any packets are in the ring buffer of the NIC), the one or more packets in the buffer of the network interface card are transferred to the corresponding queue associated with the CPU in accordance with the mapping as shown at block 326. The operating system continues to process each of the packets in the queue associated with the CPU at block 320.

If no more packets have been received by the identified ring buffer of the network interface card (e.g., no packets are in the ring buffer of the NIC) at block 324, the network interface card is instructed to switch from the polling mode to the interrupt mode for the identified ring buffer at block 328. For instance, as described above, the NIC may be instructed to switch from the polling mode to the interrupt mode for the ring buffer identified by the specific ring buffer identifier. The process then continues at block 310 to process interrupts as they are received.

As described above, both inbound and outbound packets present in the queue associated with the CPU are processed. These packets may be associated with multiple network connections as well as a single network connection.

The described embodiments may be implemented in a variety of programming languages. In accordance with one embodiment, the described embodiments are implemented in an object-oriented programming language. Languages that support object-oriented programming also accommodate and encourage multithreading in several ways. For example, Java™ supports multithreading by including synchronization modifiers in the language syntax, by providing classes developed for multithreading that can be inherited by other classes, and by performing background "garbage collection" (recovering data areas that are no longer being used) for multiple threads. Thus, in accordance with one embodiment, one or more threads are instantiated for execution of the described embodiments.

Figure 4:
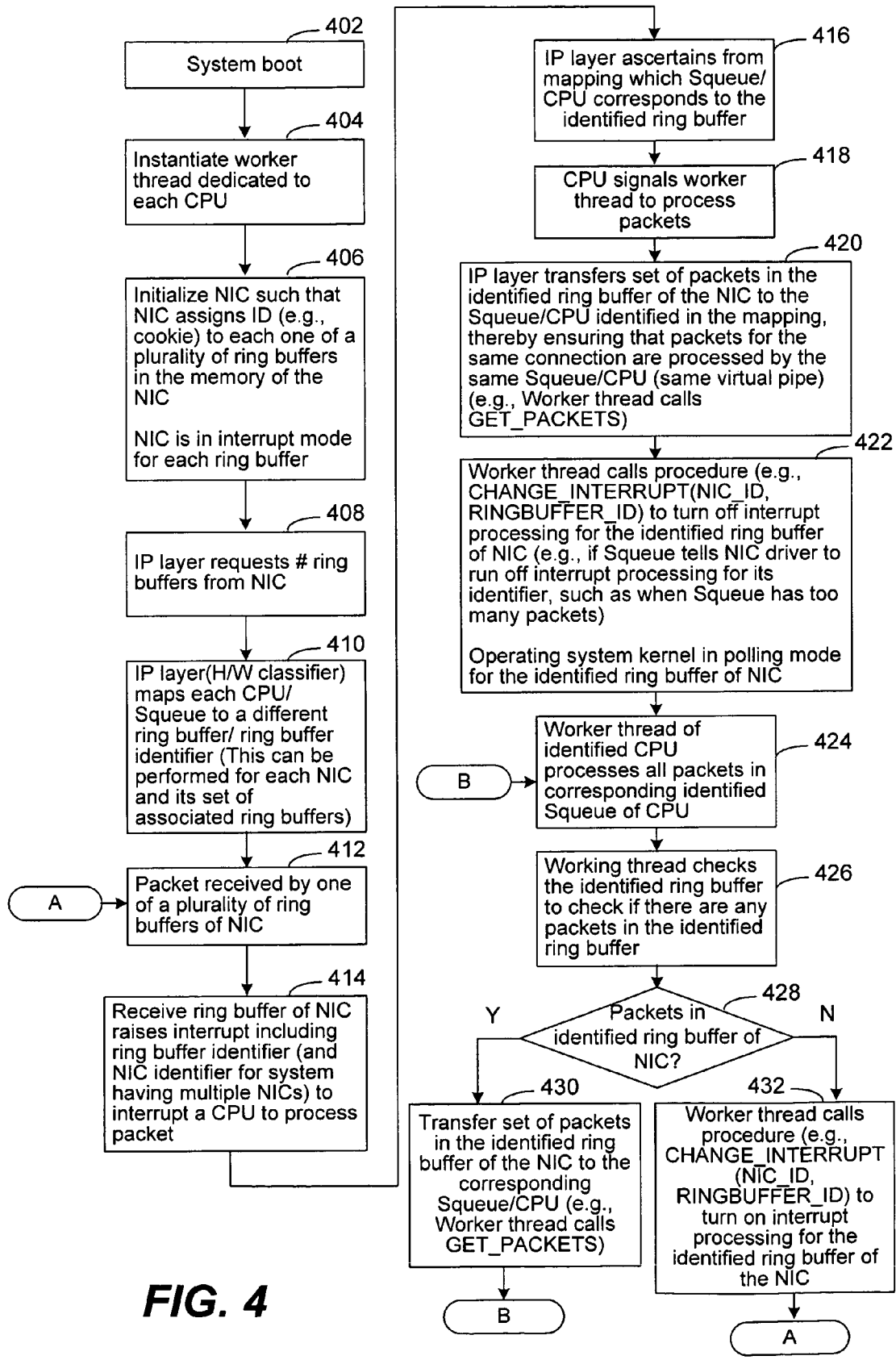
FIG. 4 is a process flow diagram illustrating one method of performing polling to handle network traffic in accordance with one embodiment of the invention.

FIG. 4 is a process flow diagram illustrating one method of performing polling to handle network traffic in accordance with one embodiment of the invention. Specifically, one or more worker threads are instantiated for execution of the above-described method. As shown at block 402, the computer system is rebooted. At that time, one or more worker threads are instantiated at block 404. In accordance with one embodiment, the worker threads are dedicated to a particular CPU. Thus, worker thread instantiation may be performed for each CPU.

At the time the system is rebooted, the system is initialized at block 406 such that each ring buffer has an associated ring buffer identifier. Specifically, each ring buffer of a NIC may be mapped to a specific CPU, thereby associating the CPU's queue with the identified ring buffer of the NIC. This may be accomplished through the use of a common identifier, as described above. In addition, the system is initialized such that the NIC is in interrupt mode for one or more ring buffers (e.g., all ring buffers) of each NIC.

As described above, the IP layer may request the number of ring buffers from each NEC at block 408, which enables the IP layer to map each ring buffer of a NIC to a corresponding CPU and software queue associated therewith at block 410.

When a packet is received by one of the plurality of ring buffers of a NIC at block 412, the NIC raises an interrupt at block 414 including a ring buffer identifier (and a NIC identifier). When the NIC interrupts the CPU to process a packet, the kernel (e.g., IP layer) ascertains from the mapping which CPU and associated software queue corresponds to the identified ring buffer at block 416.

When the CPU receives notification of the interrupt, the CPU signals a worker thread (e.g., dedicated to the CPU) to process packets at block 418. The worker thread may be dedicated to processing all packets for the CPU, or merely dedicated to processing packets in the queue associated with the CPU. Specifically, the IP layer or worker thread transfers a set of packets in the identified ring buffer of the NIC to the queue of the CPU as identified in the mapping at block 420. In accordance with one embodiment, the worker thread calls a procedure GET_PACKETS with the ring buffer identifier (and optionally the NIC identifier) as a parameter to transfer the packets from the identified ring buffer of the appropriate NIC to the queue of the CPU. As described above, the ring buffer identifier maps the CPU and its associated queue to the identified ring buffer of the NIC. The worker thread then calls a procedure CHANGE_INTERRUPT at block 422 with the ring buffer identifier (and NIC identifier) as parameters and a boolean value to turn off interrupt processing for the ring buffer identified by the ring buffer identifier (and its associated CPU). In this manner, the NIC is instructed to enter the polling mode for the identified ring buffer. (The NIC remains in interrupt mode for the remaining ring buffers.) For instance, the NIC may be instructed to enter the polling mode for the identified ring buffer when the interrupt identifying the ring buffer is received or shortly thereafter. In addition, the worker thread processes each of the packets in the queue of the CPU at block 424.

When the worker thread is done processing all of the packets in the CPU's queue, it ascertains whether the ring buffer of the NIC has received any additional packets at block 428. For instance, the specified ring buffer of the NIC may be checked to determine whether there are any packets in the ring buffer.

If more packets have been received by the identified ring buffer of the NIC (e.g. there are any additional packets in the ring buffer) at block 428, the worker thread again calls the procedure GET_PACKETS at block 430 to transfer the set of packets in the identified ring buffer of the NIC to the queue associated with the CPU identified in the mapping, as described above. The process then continues as shown at block 424 and the worker thread processes each of the packets in the queue of the CPU.

Once it is determined that the identified ring buffer of the NIC has not received any additional packets (e.g., there are no additional packets in the identified ring buffer), the worker thread calls the procedure CHANGE_INTERRUPT at block 432 with the ring buffer identifier (and NIC identifier) and a boolean value as a parameter to turn on interrupt processing for the ring buffer identified by the ring buffer identifier (and its associated CPU). In this manner, the NIC is instructed to enter the interrupt mode for the identified ring buffer. (The mode of all remaining ring buffers remains unmodified.) Thus, the NIC is instructed to switch to the interrupt mode for the identified ring buffer when no packets are in the queue associated with the CPU identified in the mapping or the identified ring buffer of the NIC. The process then continues at block 412 as interrupts are received by the CPU.

In accordance with another embodiment, the worker thread is solely responsible for processing packets in the queue of the CPU. Thus, a second worker thread is instantiated for the purpose of transferring the packets from the ring buffer of the NIC to the queue of the CPU via the GET_PACKETS procedure. This second worker thread is also responsible for TCP/IP processing of the packets. Once the chain of packets has been transferred to the queue of the CPU, the original worker thread processes the packets.

Figures 5, 6:
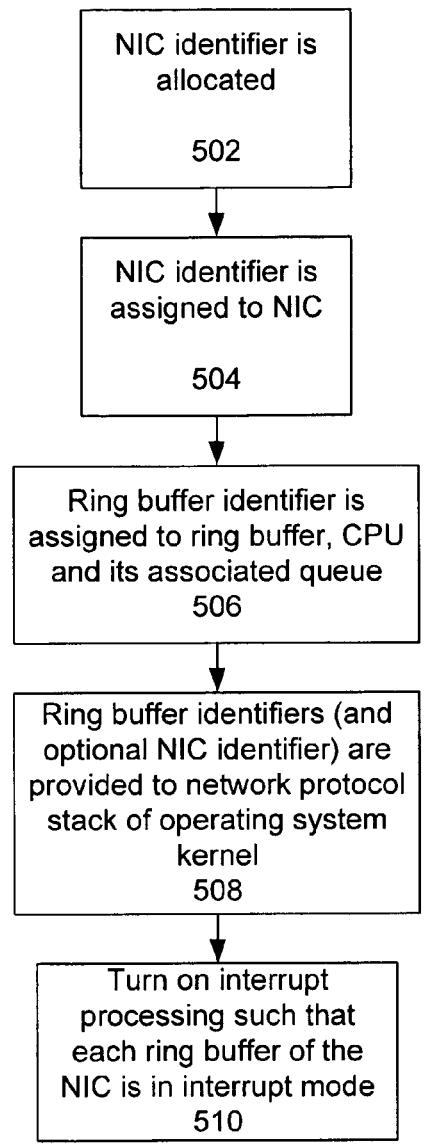
FIG. 5 is a process flow diagram illustrating one method of initializing the NIC as shown at block 406 of FIG. 4 to support dynamic polling in accordance with one embodiment of the invention.
FIG. 6 is a diagram illustrating an exemplary mapping between ring buffers and CPUs and associated memories in accordance with one embodiment of the invention.

FIG. 5 is a process flow diagram illustrating one method of initializing the NIC as shown at block 406 of FIG. 4 to support dynamic polling in accordance with one embodiment of the invention. As described above, in accordance with one embodiment, a ring buffer identifier is used to map a CPU and its associated queue to a ring buffer of a NIC. In addition, since multiple NICs may be implemented, the NIC is identified by a NIC identifier. (Alternatively, a single identifier may be used to identify each ring buffer of all of the NICs.) Thus, a NIC identifier may be allocated at block 502. The NIC identifier is assigned to the NIC at block 504. In addition, a ring buffer identifier is assigned to each ring buffer, which is mapped to a CPU and its associated queue at block 506. In this manner, a ring buffer identifier is associated with a CPU and its associated queue, as well as associated with a ring buffer of a NIC. Each ring buffer identifier (and optional NIC identifier) is then provided to the network protocol stack of the operating system kernel at block 508, as well as to the NIC. In this manner, the operating system kernel and the NIC may communicate with each other using the ring buffer identifier (and NIC identifier). Interrupt processing is then initiated such that the NIC is in interrupt mode for one or more ring buffers (e.g., all of the ring buffers) of the NIC at block 510.

FIG. 6 is a diagram illustrating an exemplary mapping that may be generated and maintained (e.g., by the IP layer). In this example, each ring buffer identifier is mapped to a CPU and associated software queue. The ring buffer identifier may be unique for all ring buffers among all NICs (as shown in this example). Alternatively, the ring buffer identifier may be used in combination with a NIC identifier to identify a particular ring buffer.

The above-described embodiments enable a NIC and its mode of operation in association with a particular ring buffer to be controlled by an operating system kernel. Specifically, the ability of a NIC to interrupt a CPU on behalf of a particular ring buffer may be disabled or enabled. This mode of operation may be a general mode of operation. Alternatively, this mode of operation may be specific to the handling of packets received by the ring buffer of the NIC.

Figure 7:
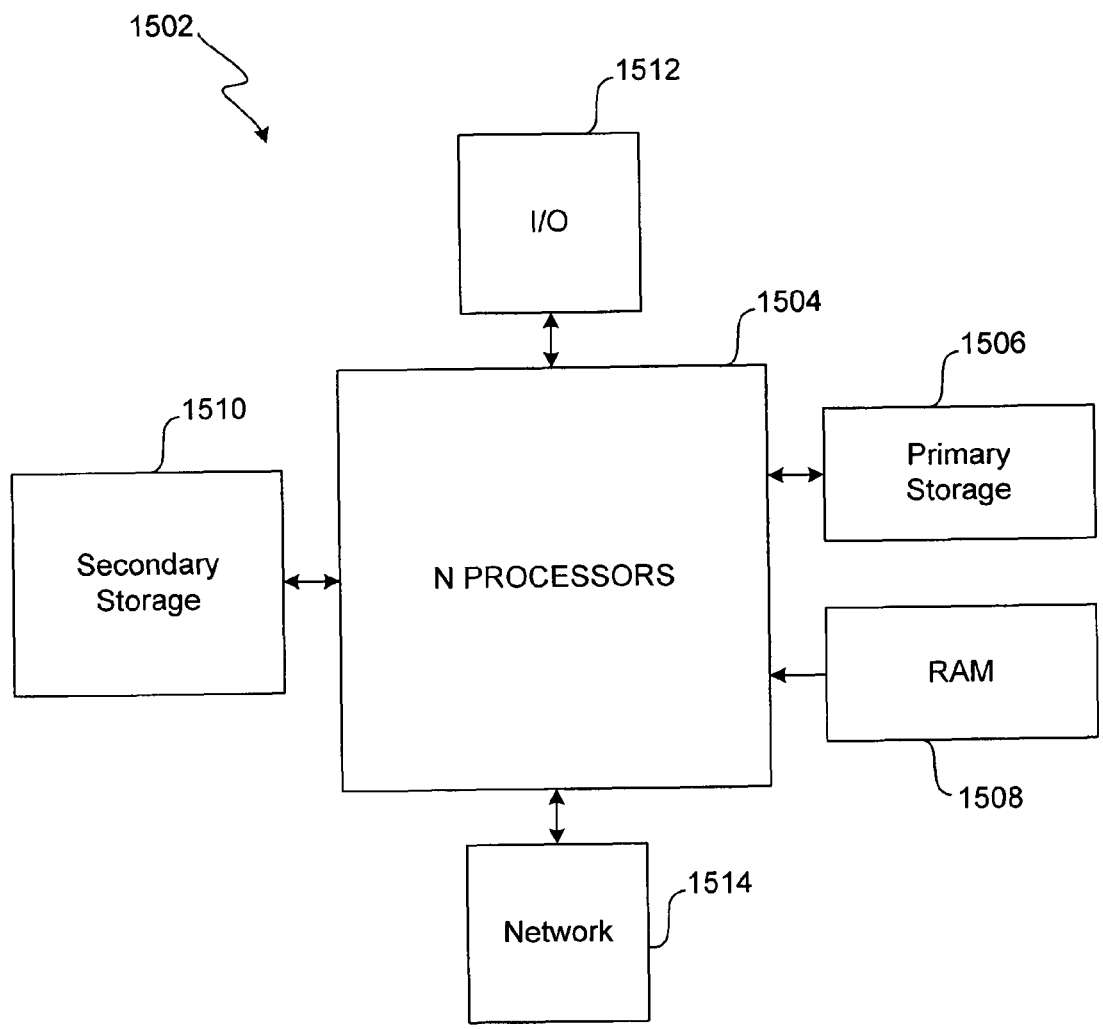
FIG. 7 is a block diagram illustrating a typical, general-purpose computer system suitable for implementing the present invention.

The present invention may be implemented on any suitable computer system. FIG. 7 illustrates a typical, general-purpose computer system 1502 suitable for implementing the present invention. The computer system may take any suitable form.

The computer system 1502 includes any number of processors 1504 (also referred to as central processing units, or CPUs) that may be coupled to memory devices including primary storage device 1506 (typically a read only memory, or ROM) and primary storage device 1508 (typically a random access memory, or RAM). Both the primary storage devices 1506, 1508 may include any suitable computer-readable media. The CPUs 1504 may generally include any number of processors.

A secondary storage 1510, which is typically a mass memory device, may also be coupled bi-directionally to CPUs 1504 and provides additional data storage capacity. The secondary storage 1510 is a computer-readable medium that may be used to store programs including computer code, data, and the like. Typically, the secondary storage 1510 is a storage medium such as a hard disk which is generally slower than primary storage devices 1506, 1508.

The CPUs 1504 may also be coupled to one or more input/output devices 1512 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 1504 optionally may be coupled to a computer or telecommunications network, e.g., an interne network or an intranet network, using a network connection as shown generally at 1514. With such a network connection, it is contemplated that the CPUs 1504 might receive information from the network, or might output information to the network in the course of performing the above-described method steps. Such information, which is often represented as a sequence of instructions to be executed using the CPUs 1504, may be received from and outputted to the network, for example, in the form of a computer data signal embodied in a carrier wave. It is contemplated that one or more of the elements of the computer system 1502 may be located remotely and accessed via a network.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the above-described embodiments are set forth in relation to the use of a single NIC driver, these embodiments are merely illustrative. Accordingly, the described embodiments may be implemented with respect to a variety of systems and may therefore be implemented with a greater number of drivers. For instance, a driver may be implemented in association with each NIC. Moreover, the above described process blocks are illustrative only. Therefore, the communication between the computer operating system and each NIC may be performed using alternate process blocks as well as alternate data structures. Accordingly, the present embodiments are to be considered as illustrative and not restrictive, and the invention is not to be limited to the details given herein, but may be modified within the scope and equivalents of the appended claims.

What is claimed is:

1. A method of configuring a network interface card, comprising:

mapping each one of a plurality of ring buffers associated with a network interface card (NIC) to one of a plurality of processors, wherein a first queue is associated with a first processor of the plurality of processors and a second queue is associated with a second processor of the plurality of processors, and, wherein the NIC comprises a driver to facilitate communication between the NIC and the plurality of processors;

wherein the NIC is dynamically instructed, by an operating system, to individually operate each of the plurality of ring buffers in one of a polling mode and an interrupt mode, wherein the operating system is configured to communicate with the NIC using at least one of a plurality of ring buffer identifiers and an application programming interface of the driver, wherein each of the plurality of ring buffers is associated with one of the plurality of ring buffer identifiers;

operating a first of the plurality of ring buffers associated with the NIC in the interrupt mode by:
obtaining, from the mapping, a first ring buffer identifier of the plurality of ring buffer identifiers associated with the first processor of the plurality of processors, and
sending an instruction comprising the first ring buffer identifier to the NIC,
wherein the first ring buffer is operated in the interrupt mode when the memory mapped to the one of the plurality of ring buffers has less than a predefined number of packets or packets are received from the one of the plurality of ring buffers at less than a predefined rate;

operating a second of the plurality of ring buffers associated with the NIC in a polling mode by:
obtaining, from the mapping, a second ring buffer identifier of the plurality of ring buffer identifiers associated with the second processor of the plurality of processors, and
sending an instruction comprising the second ring buffer identifier to the NIC,
wherein the second ring buffer is operated in the polling mode when the memory mapped to the one of the plurality of ring buffers has greater than a predefined number of packets or packets are received from one of the plurality of ring buffers at greater than a predefined rate;

transferring, by the operating system, packets from the first ring buffer to the first queue of the first processor; and
transferring, by the operating system, packets from the second ring buffer to the second queue of the second processor.

2. The method as recited in claim 1, wherein operating one of the plurality of ring buffers associated with the NIC in the interrupt mode comprises:
enabling the NIC to interrupt one of the plurality of processors when a packet is received by one of the plurality of ring buffers mapped thereto.

3. The method as recited in claim 1, wherein operating one of the plurality of ring buffers associated with the NIC in a polling mode comprises:
disabling the NIC from interrupting one of the plurality of processors when a packet is received by one of the plurality of ring buffers mapped thereto.

4. A method of processing packets in a computer system including an operating system and a network interface card (NIC), the NIC having a plurality of ring buffers, comprising:
mapping each one of the plurality of ring buffers associated with the NIC to one of a plurality of processors, wherein a first queue is associated with one a first processor of the plurality of processors and a second queue is associated with a second processor of the plurality of processors,
wherein the NIC comprises a driver to facilitate communication between the NIC and the plurality of processors;
polling the NIC to determine whether one or more packets have been received by a first ring buffer of the plurality of ring buffers when the NIC is in a polling mode for the first ring buffer;
receiving an interrupt from the NIC when the NIC is in an interrupt mode for a second ring buffer of the plurality of ring buffers, the interrupt indicating that the second ring buffer of the NIC has received one or more packets,
wherein the NIC is capable of being dynamically instructed, by the operating system, to individually operate each of the plurality of ring buffers in one of the polling mode and the interrupt mode, wherein the operating system is configured to communicate with the NIC using at least one of a plurality of ring buffer identifiers and an application programming interface of the driver, wherein each of the plurality of ring buffers is associated with one of the plurality of ring buffer identifiers;
obtaining a first ring buffer identifier of the plurality of ring buffer identifiers corresponding to the first ring buffer and a second ring buffer identifier of the plurality of ring buffer identifiers corresponding to the second ring buffer;
transferring, by the operating system, packets from the first ring buffer to the first queue of the first processor associated with the first ring buffer identifier obtained from the mapping; and
transferring, by the operating system, packets from the second ring buffer to the second queue of the second processor associated with the second ring buffer identifier obtained from the mapping, when the interrupt occurs.

5. The method as recited in claim 4, wherein the interrupt identifies the second ring buffer.

6. The method as recited in claim 4, wherein the mapping is provided in an IP layer of the kernel of the operating system.

7. The method as recited in claim 4, wherein each one of the plurality of processors mapped to one of the plurality of ring buffers is responsible for performing polling and receiving an interrupt from the one of the plurality of ring buffers.

8. The method as recited in claim 4, further comprising:
obtaining packets from the first ring buffer of the NIC and processing the packets obtained from the one of the plurality of ring buffers of the NIC.

9. The method as recited in claim 4, further comprising:
instructing the NIC to operate in the polling mode for the first ring buffer when packets are being received frequently from the first ring buffer of the NIC; and
instructing the NIC to operate in the interrupt mode for the second ring buffer when packets are being received infrequently from the second ring buffer of the NIC.

10. The method as recited in claim 4, further comprising:
instructing the NIC to operate in the polling mode for the first ring buffer when a number of packets received per second from the first ring buffer of the NIC is greater than a predefined number; and
instructing the NIC to operate in the interrupt mode for the second ring buffer when the number of packets received per second from the second ring buffer of the NIC is less than the predefined number.

11. The method as recited in claim 4, wherein the computer system includes a plurality of processors, each of the plurality of processors having an associated memory, each of the plurality of ring buffers being mapped to one of the plurality of processors and its associated memory, the method further comprising:

instructing the NIC to operate in the polling mode for the first ring buffer when the memory mapped to first ring buffer includes greater than a predefined number of packets.

12. The method as recited in claim 11, further comprising:
instructing the NIC to operate in the interrupt mode for the second ring buffer when the memory mapped to the second ring buffer includes less than the predefined number of packets.

13. The method as recited in claim 4, further comprising:
ascertaining whether the NIC is in the interrupt mode or the polling mode for one or more of the plurality of ring buffers.

14. The method as recited in claim 4, further comprising:
initializing the NIC such that the NIC is in the interrupt mode for one or more of the plurality of ring buffers.

15. The method as recited in claim 4, further comprising:
instructing the NIC to switch from the polling mode to the interrupt mode for one or more of the plurality of ring buffers.

16. The method as recited in claim 15, wherein instructing the NIC to switch from the polling mode to the interrupt mode comprises instructing the NIC to switch from the polling mode to the interrupt mode for a specified period of time.

17. The method as recited in claim 4, further comprising:
instructing the NIC to switch from the interrupt mode to the polling mode for one or more of the plurality of ring buffers.

18. The method as recited in claim 17, wherein instructing the NIC to switch from the interrupt mode to the polling mode comprises instructing the NIC to switch from the interrupt mode to the polling mode for a specified period of time.

19. The method as recited in claim 4, wherein the packets are transferred simultaneously from the first ring buffer to the first processor and the second ring buffer to the second processor.

20. The method as recited in claim 4, further comprising:
instructing the NIC to switch from the polling mode to the interrupt mode for the first ring buffer when no packets are in the first queue associated with one selected from a group consisting of the first processor or the first ring buffer of the NIC.

21. The method as recited in claim 4, further comprising:
instructing the NIC to switch from the interrupt mode to the polling mode for the second ring buffer when the interrupt is received from the NIC.

22. The method as recited in claim 4, further comprising:
processing each of the packets in the first queue of the first processor and the second queue of the second processor.

23. The method as recited in claim 22, wherein each of the packets in the first and second queues corresponds to one or more network connections.

24. The method as recited in claim 22, further comprising:
instructing the NIC to switch from the interrupt mode to the polling mode for the second ring buffer prior to processing each of the packets in the second queue of the second processor.

25. The method as recited in claim 22, further comprising:
instructing the NIC to switch from the interrupt mode to the polling mode for the second ring buffer.

26. The method as recited in claim 25, further comprising:
after processing each of the packets in the second queue, polling the second ring buffer of the NIC to determine if one or more packets have been received by the second ring buffer of the NIC; and
if one or more packets have been received by the second ring buffer of the NIC, transferring the one or more packets from the second ring buffer to the second queue associated with the second processor and processing each of the packets in the second queue.

27. The method as recited in claim 26, further comprising:
if no more packets have been received by the second ring buffer of the NIC, instructing the NIC to switch from the polling mode to the interrupt mode for the second ring buffer.

28. The method as recited in claim 25, further comprising:
instructing the NIC to switch from the polling mode to the interrupt mode for the second ring buffer after processing each of the packets in the second queue of the second processor.

29. The method as recited in claim 22, further comprising:
instructing the NIC to switch from the polling mode to the interrupt mode for the first ring buffer after processing each of the packets in the first queue of the first processor.

30. The method as recited in claim 4, further comprising:
instantiating a worker thread for processing packets in the first and second queues.

31. The method as recited in claim 30, wherein the worker thread or a second worker thread is responsible for transferring packets from the first and second ring buffers to the first and second queues.

32. The method as recited in claim 30, wherein the worker thread is responsible for instructing the NIC to switch from polling mode to interrupt mode for the first ring buffer when no packets are in the first queue associated with the first processor or the first ring buffer.

33. The method as recited in claim 30, wherein the worker thread is responsible for instructing the NIC to switch from the interrupt mode to the polling mode for the second ring buffer after an interrupt identifying the second ring buffer is received from the NIC.

34. The method as recited in claim 4, further comprising:
instructing the NIC to enter the polling mode for the first ring buffer identified by a corresponding ring buffer identifier.

35. The method as recited in claim 4, further comprising:
instructing the NIC to enter the interrupt mode for the second ring buffer identified by a corresponding ring buffer identifier.

36. The method as recited in claim 35, wherein the interrupt includes the corresponding ring buffer identifier.

37. The method as recited in claim 4, further comprising:
instructing the NIC to operate in the polling mode for the first ring buffer when a packet that is received from the first ring buffer or transmitted via the first ring buffer is already being processed and one or more packets are queued in the first queue associated with the first processor; and
instructing the NIC to operate in the interrupt mode for the first ring buffer when there are no queued packets in the first queue associated with the first processor.

38. A computer system, comprising:
a plurality of processors;
an operating system;
a network interface card (NIC) coupled to the operating system and having a first ring buffer and a second ring buffer, wherein each of the first and second ring buffers is associated with one of a plurality of ring buffer identifiers;

a mapping stored in the computer system configured to map each ring buffers to one of the plurality of processors and a corresponding queue, wherein a first queue is associated with a first processor of the plurality of processors and a second queue is associated with a second processor of the plurality of processors wherein the NIC is capable of being dynamically instructed, by the operating system, to individually operate the first ring buffer in an interrupt mode and the second ring buffer in a polling mode, wherein the operating system is configured to:

obtain, from the mapping, a first ring buffer identifier of the plurality of ring buffer identifiers associated with a first processor of the plurality of processors;

send an instruction comprising the first ring buffer identifier to the NIC to operate the first ring buffer in the interrupt mode when the first ring buffer has less than a predefined number of packets or packets are received from the first ring buffer at less than a predefined rate;

obtain, from the mapping, a second ring buffer identifier of the plurality of ring buffer identifiers associated with a second processor of the plurality of processors;

send an instruction comprising the second ring buffer identifier to the NIC to operate the second ring buffer in the polling mode when the second ring buffer has greater than the predefined number of packets or packets are received from the second ring buffer at more than the predefined rate;

transfer packets from the first ring buffer to the first queue corresponding to the first processor associated with the first ring buffer identifier in the mapping; and transfer packets from the second ring buffer to the second queue corresponding to the second processor associated with the second ring buffer identifier in the mapping.

39. The computer system as recited in claim 38, the NIC being unable to interrupt the operating system on behalf of one of the plurality of ring buffers when in the polling mode for the one of the plurality of ring buffers for packets having low priority and being able to interrupt the system on behalf of the one of the plurality of ring buffers when in the polling mode for the one of the plurality of ring buffers for packets having high priority.

40. The computer system as recited in claim 38, wherein the first and second queues are adapted for storing inbound and outbound packets.

41. The computer system as recited in claim 38, further comprising:

the operating system for instructing the NIC to switch from the interrupt mode to the polling mode for one or more of the plurality of ring buffers; and the operating system for instructing the NIC to switch from the polling mode to the interrupt mode for one or more of the plurality of ring buffers.

42. The computer system as recited in claim 38, further comprising:

a driver including a call interface between a kernel of the operating system and the NIC, the call interface enabling the kernel of the operating system to instruct the NIC to enter the interrupt mode or the polling mode for one or more of the plurality of ring buffers.

\* \* \* \* \*

UNITED STATES PATENT AND TRADEMARK OFFICE
CERTIFICATE OF CORRECTION

| | | |
|---|---|---|
| PATENT NO. | : 7,937,499 B1 | Page 1 of 1 |
| APPLICATION NO. | : 10/888521 | |
| DATED | : May 3, 2011 | |
| INVENTOR(S) | : Sunay Tripathi | |

It is certified that error appears in the above-identified patent and that said Letters Patent is hereby corrected as shown below:

ON THE TITLE PAGE:
    In the 6th line of the abstract, "for a ring buffer" should be deleted.

IN THE CLAIMS:
    In Claim 38, Column 17 (line 5) after "each", --one of the plurality of-- should be added.

Signed and Sealed this
Ninth Day of August, 2011

David J. Kappos
*Director of the United States Patent and Trademark Office*